Dec. 22, 1953     J. F. SMOLE ET AL     2,663,124
EXPANDABLE HONE
Filed July 17, 1946
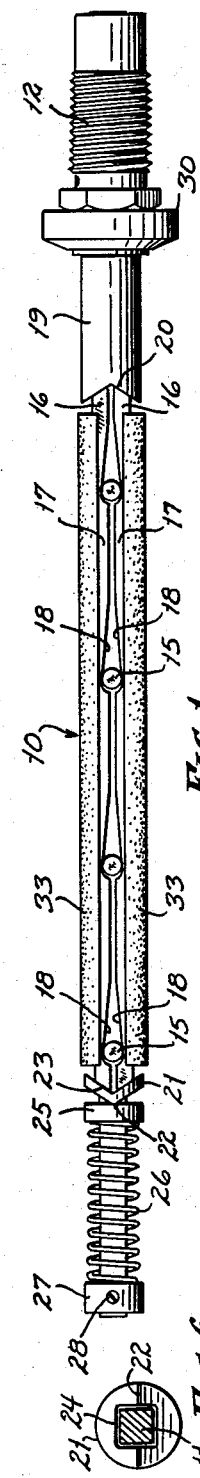
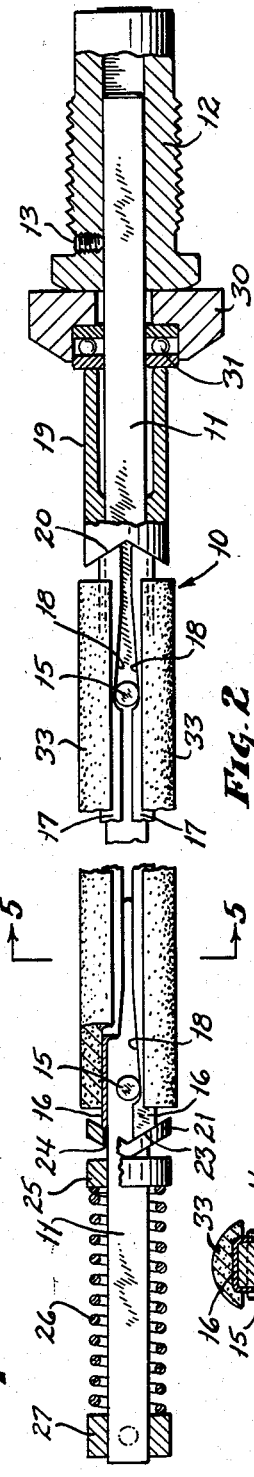
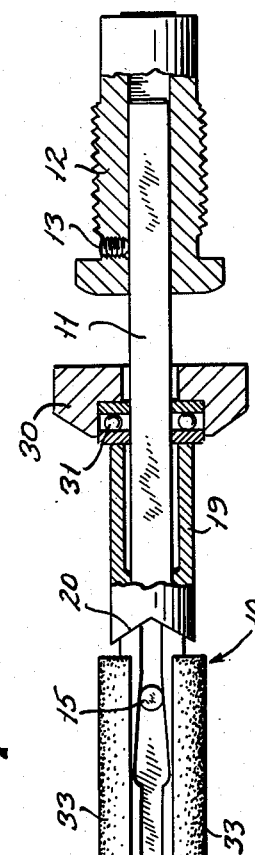
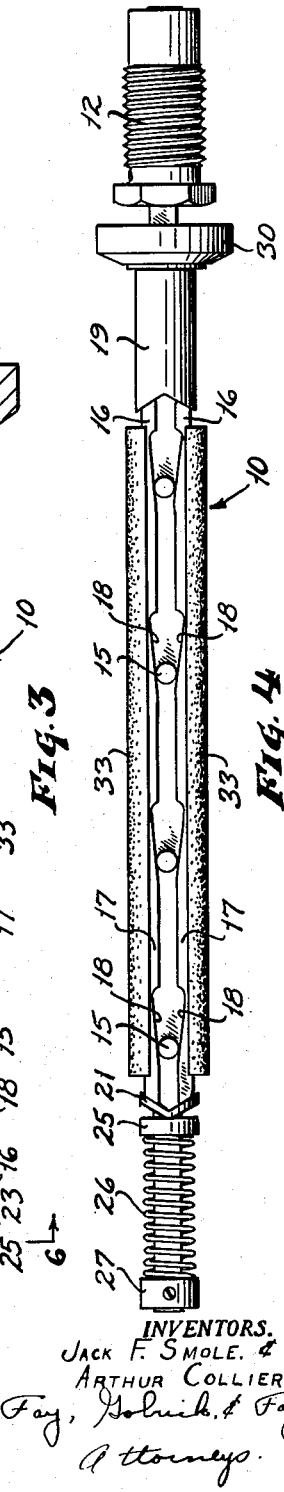
INVENTORS.
JACK F. SMOLE &
ARTHUR COLLIER
BY Fay, Golrick, & Fay.
Attorneys.

Patented Dec. 22, 1953

2,663,124

UNITED STATES PATENT OFFICE 2,663,124

EXPANDABLE HONE

Jack F. Smole, Cleveland Heights, and Arthur Collier, Cleveland, Ohio, assignors, by mesne assignments, to Lempco Products, Inc., Bedford, Ohio, a corporation of Ohio Application July 17, 1946, Serial No. 684,270

6 Claims. (Cl. 51—184.3)

The present invention relates to adjustable expansion metal working tools, and more particularly to expansible hones.

An object of the present invention is to provide an expansible hone, or a similar metal working tool, in which the mechanism for effecting the expansion may be formed of relatively few parts, including stampings or die castings, for example, so that the expense of such tools may be greatly reduced below that of previously known tools of this type, and without sacrificing the accuracy of operation of the tool.

Another object of the invention is to provide an expansible hone of the type employing cam surfaces for effecting radial movement of the cutting or honing elements, the construction being such that no machining operations are necessary in the formation of the cams, the cams being formed by a stamping operation or by die casting.

Another object of the invention is to provide for the ready reversal of the camming elements so that the operating characteristics of the hone may be easily changed by the user, if desired.

Still another object of the invention is to provide in an expansible hone, of the type in which two or more stone carriers are mounted on a mandrel and are moved longitudinally thereof for causing radial movement of the carriers, the means for positioning the carriers radially consisting of an adjustable stop member at one end of the carriers and a spring pressed member at the opposite end of the carriers for resiliently urging the carriers against the adjustable stop member, an equalizer interposed between the carriers and one of the members so that equal spring pressure will be applied to each carrier, although the length of the carriers may not be exactly equal.

Other objects and advantages of the invention will be apparent from the following description, reference being made to the accompanying drawing wherein:

Fig. 1 is a side elevational view of a hone tool embodying my invention;

Fig. 2 is a view similar to that of Fig. 1, but partly in section and drawn to a large scale;

Fig. 3 is a view similar to that of Fig. 2 but showing certain parts of the tool in different positions;

Fig. 4 is a view similar to that of Fig. 1 but showing stone carrying members thereof in reversed positions;

Fig. 5 is a view taken in section on line 5—5 of Fig. 2; and

Fig. 6 is a view in section taken one line 6—6 of Fig. 3.

Heretofore adjustable expansion hones have been provided in which the honing stones were carried by backing members or carriers supported on a mandrel, and these carriers were adjustable radially of the mandrel by means of camming arrangements. Generally, the mandrel has been provided with cam surfaces which were adapted to react on complementarily shaped cam surfaces associated with the stone carriers. These types of mechanisms have required considerable precision machining which necessarily increased the cost of manufacture. By our invention, we propose to eliminate substantially all precision machine work so that the expansion of the hones may be effected by mechanism formed by inexpensive methods and yet which will have the operating accuracy desired.

Referring now to the drawings, we have shown generally at 10 an expansible hone. The hone 10 comprises an elongated mandrel 11 which is preferably square in cross-section as may be seen in Fig. 5. One end of the mandrel is received in a head 12 and secured therein by a lockscrew 13, the head 12 being threaded for drivingly attaching the mandrel in the spindle of a suitable driving mechanism, not shown, The mandrel 11 is bored through in four places intermediate its ends, the bores being at right angles to the axis thereof, and four pins 15 are drivingly secured in the bores. The pins 15 are circular, and preferably they are of hardened metal. It is to be understood that more or fewer than four pins may be used, as desired.

A pair of stone carriers 16, which are channel shaped in cross-section, are adapted to overlie and embrace opposite sides of the mandrel 11, and the channel flanges 17 of the carriers are adapted to extend over the surfaces of the mandrel from which the pins 15 project. Stones 33 are mounted on the webs of the channels by any of the well known commercial cements suitable for the purpose. The channel flanges 17 are provided with cam shaped edge portions or cams 18, which are all formed similarly to one another and which are adapted to engage the respective pins 15 as cam followers. Preferably, the carriers are of sheet metal, formed in the shape shown and described, by a stamping operation, although they could be formed by other methods, such as die casting. The opposite ends of the carriers 16 are oppositely tapered toward the axis of the mandrel and at one end the carriers are engaged by a sleeve 19, movable longitudinally on the mandrel 11, and which is notched to form two surfaces 20 that substantially coincide with the tapered ends of the carriers. The opposite ends of the carriers are engaged by a washer or yoke 21 which is bent on a diameter as at 22 to form two surfaces 23 which substantially coincide with the tapered ends of the carriers. The washer 21 has a rectangular central opening 24 which is slightly larger than the cross sectional area of the mandrel, as may be seen in Fig. 6, so that the washer may freely move longitudinally on the mandrel, and also may rock about the diametral edge provided by the bend. The washer 21 is resiliently urged against the carrier ends by a collar 25 that is spring pressed by a compression spring 26 disposed between collar 25 and an abutment member 27 secured to the mandrel by a screw 28. The surface of collar 25 engaging the washer 21 is planar so that in the event one of the carriers 16 is shorter than the other, due to a discrepancy in production, for example, the washer will rock on its diametral edge to contact both surfaces 23 and and transmit the force of the spring 26 equally to the respective carriers. By this arrangement, the washer 21 serves as a force equalizer between the spring 26 and the carriers so that the carriers will always be urged into abutting relation with surfaces 20 on the sleeve 19 and the longitudinal position of the carriers will be determined by the position of sleeve 19. The surfaces 20 and 23 of the sleeve 19 and washer 21, respectively, act as cams and exert radially inward components of force on the ends of the carriers 16 to urge the latter into engagement with the pins 15 at all times. The washer 21, by being adaptable to uniformly engage both carriers, also prevents chatter of the carriers inasmuch as they will always be maintained under compression between the surfaces 20 and 23 of the sleeve 19 and washer 21, respectively.

The sleeve 19 is adapted to be moved longitudinally on the mandrel 11 by an adjusting collar 30, the collar 30 being mounted on a thrust bearing 31 so that it may rotate freely relative to the mandrel. The adjusting collar is adapted to be moved longitudinally by mechanism associated with the machine that rotates the mandrel, which mechanism and machine do not form part of the invention and are therefore not shown. It will be seen that the sleeve 19 is in effect a longitudinally movable stop the position of which determines the position of the carriers 16 longitudinally on the mandrel.

It will now be apparent that when the carriers 16 are placed on the mandrel as indicated in Fig. 1, the work can be placed over the hone and sleeve 19 may then be moved to the left, to move the carriers toward the left and the cams 18 of the carriers, coacting with the pins 15 as cam followers, cause outward radial movement of the carriers to cut the work; and that when the sleeve 19 is retracted toward the right, or when the force which moves it is withdrawn, the spring 26 moves the carriers toward the right, and they concurrently move inwardly radially, the carriers being biased at all times to tend to move inwardly radially and keep the cams 18 in contact with the pins 15 as described; and the work may then be withdrawn from the hone.

The carriers being biased toward positions of minimum diameter of the stones 33 at all times, the expansion of the stones will be effected by movement of the collar 30.

If the carriers are put on the mandrel in the reverse positions as shown in Fig. 4, the action of spring 26 will tend to bias the carriers to the right for causing expansion of the hone. It will be evident that by this arrangement the adjusting collar 30 may be moved to the left to contract the hone and the work then placed over the hone set for the desired expansion of the hone, and the stones while working and abrading the work, will be resiliently urged by the spring 26 outwardly to the maximum diameter for which the hone is thus set. The hone will thus automatically cut the work to the desired diameter, and then may be withdrawn.

It will be evident from the foregoing that we have provided an extremely simple expansible hone mechanism and one which may be formed by inexpensive operations and from a minimum of parts. By forming the carrier 16 by low cost stamping operations or by die casting, it is economical to discard these carriers prior to the time they have worn sufficiently to cause inaccuracy in their use. Also, it will be observed that the replacement or reversal of the stones, including the carriers, is quite simple, it merely being necessary to retract collar 22 against the tension of spring 26, thereby permitting the free removal and replacement of the carriers 16.

Although we have described but one form of the invention, it is to be understood that other forms might be adopted, all falling within the scope of the claims which follow.

We claim:

1. An adjustable hone comprising a spindle of polygonal cross-section having spaced pairs of oppositely extending cam surfaces extending from opposite faces thereof; a pair of substantially U-shaped blades straddling opposite faces of the spindle and having inclined recesses engaging related cam surfaces of the spindle; stones on the outer faces of the blades adapted to together form an approximately cylindrical honing surface; means for maintaining the blades assembled on the spindle while permitting simultaneous shifting of the blades on the spindle to vary the effective diameter of the honing surfaces of the stones; said spindle having a longitudinally disposed series of holes extending therethrough intermediate the blades; and correspondingly shaped blocks forming the cam surfaces filling said holes and extending beyond the sides of the spindle and engaging the inclined recesses of the blades.

2. An adjustable hone comprising a spindle having spaced pairs of oppositely extending cam surfaces extending from opposite faces thereof; a pair of substantially U-shaped blades straddling opposite faces of the spindle and having inclined recesses engaging cam surfaces of the spindle; stones on the outer faces of the blades adapted to together form an approximately cylindrical honing surface; means for maintaining the blades assembled on the spindle while permitting simultaneous shifting of the blades on the spindle to vary the effective diameter of the honing surfaces of the stones; said spindle having a longitudinally disposed series of holes extending laterally therein intermediate the blades; and means engaged in said holes and carrying said oppositely extended cam surfaces for engaging the inclined recesses of the blades.

3. A hone tool adapted to be rotatably driven by a machine of the type having a movable, adjustably positionable hone adjusting element, comprising: an elongated mandrel; a plurality of pin like projections extending laterally from a side of the mandrel and characterized by circumscribing side walls extending transversely of the mandrel; a generally channel shaped elongated abrading stone carrier; the carrier embracing a longitudinally extending portion of the mandrel between its channel flanges, and being movable longitudinally of the mandrel; the edges of the channel flanges being in the form of cams extending longitudinally of the carrier and engageable with the said side walls of the projections; whereby when the carrier is moved longitudinally of the mandrel; the carrier will be cammingly moved radially of the mandrel, and means for selectively positioning the carrier longitudinally of the mandrel comprising means on the mandrel engageable by the said movable adjustably positionable element of the machine and correspondingly movable therewith and reacting on the carrier to correspondingly move and position it longitudinally.

4. A honing tool comprising a mandrel substantially rectangular in cross section; an elongated channel shaped abrading stone carrier disposed with its channel flanges overlying opposite sides of the mandrel and its web overlying the side of the mandrel intermediate said opposite sides; a plurality of projections extending from said opposite sides of the mandrel and characterized by circumscribing side walls extending transversely of the mandrel; the edges of said flanges having longitudinally extending cam surfaces formed thereon; the cam surfaces being adapted to engage the said side walls of respective projections whereby when the carrier is moved longitudinally it will be moved radially of the mandrel by co-action of the cam surfaces and projections; and resilient means reacting on the mandrel and carrier constraining the carrier to move longitudinally in one direction.

5. An adjustable hone comprising a spindle of polygonal cross-section having spaced pairs of oppositely extending cam follower surfaces extending from opposite faces thereof; a pair of substantially U-shaped blades straddling opposite faces of the spindle and having inclined recesses engageing related cam follower surfaces of the spindle; stones on the outer faces of the blades adapted to together form an approximately cylindrical honing surface; means maintaining the blades assembled on the spindle while permitting simultaneous shifting of the blades on the spindle to vary the effective diameter of the honing surfaces of the stones; said spindle having a longitudinally disposed series of holes extending therethrough intermediate the blades; and correspondingly shaped blocks forming the cam followers filling said holes and extending beyond the sides of the spindle and engageing the inclined recesses of the blades.

6. An adjustable hone comprising a spindle having spaced pairs of oppositely extending cam follower surfaces extending from opposite faces thereof; a pair of substantially U-shaped blades straddling opposite faces of the spindle and having inclined recesses engageing cam follower surfaces of the spindle; stones on the outer faces of the blades adapted to together form an approximately cylindrical honing surface; means maintaining the blades assembled on the spindle while permitting simultaneous shifting of the blades on the spindle to vary the effective diameter of the honing surfaces of the stones; said spindle having a longitudinally disposed series of holes extending laterally therein intermediate the blades; and means engaged in said holes and carrying said oppositely extended cam follower surfaces for engageing the inclined recesses of the blades.

JACK F. SMOLE.
ARTHUR COLLIER.

References Cited in the file of this patent

UNITED STATES PATENTS

| Number | Name | Date |
| --- | --- | --- |
| 1,302,588 | Pleister | May 6, 1919 |
| 1,904,336 | Sunnen | Apr. 18, 1933 |
| 1,910,658 | Tydeman | May 23, 1933 |
| 2,302,207 | Gjertsen | Nov. 17, 1942 |
| 2,349,994 | Snader | May 30, 1944 |
| 2,412,419 | Palotsee | Dec. 10, 1946 |
| 2,421,490 | Evans | June 3, 1947 |
| 2,432,855 | Blazek | Dec. 16, 1947 |